US010829668B2

(12) United States Patent
Son et al.

(10) Patent No.: US 10,829,668 B2
(45) Date of Patent: Nov. 10, 2020

(54) PRESSURE-SENSITIVE ADHESIVE COMPOSITION

(71) Applicant: LG Chem, Ltd., Seoul (KR)

(72) Inventors: Sang Ha Son, Daejeon (KR); Jeong Sik Bae, Daejeon (KR); Jeong Ae Yoon, Daejeon (KR); Sung Soo Yoon, Daejeon (KR)

(73) Assignee: LG Chem, Ltd. (KR)

( * ) Notice: Subject to any disclaimer, the term of this patent is extended or adjusted under 35 U.S.C. 154(b) by 235 days.

(21) Appl. No.: 15/781,610

(22) PCT Filed: Dec. 7, 2016

(86) PCT No.: PCT/KR2016/014281
§ 371 (c)(1),
(2) Date: Jun. 5, 2018

(87) PCT Pub. No.: WO2017/099465
PCT Pub. Date: Jun. 15, 2017

(65) Prior Publication Data
US 2020/0123423 A1    Apr. 23, 2020

(30) Foreign Application Priority Data
Dec. 7, 2015 (KR) .......................... 10-2015-0173247

(51) Int. Cl.
| G02B 1/16 | (2015.01) |
| G02B 1/18 | (2015.01) |
| C09J 9/02 | (2006.01) |
| C09J 11/06 | (2006.01) |
| C09J 133/08 | (2006.01) |
| C09J 7/38 | (2018.01) |
| C09J 7/22 | (2018.01) |
| C08K 5/3445 | (2006.01) |
| C09J 133/06 | (2006.01) |

(52) U.S. Cl.
CPC ............... *C09J 11/06* (2013.01); *C09J 7/22* (2018.01); *C09J 7/385* (2018.01); *C09J 9/02* (2013.01); *C09J 133/066* (2013.01); *C09J 133/08* (2013.01); *G02B 1/16* (2015.01); *G02B 1/18* (2015.01); *C08K 5/3445* (2013.01); *C08K 2201/001* (2013.01); *C09J 2203/318* (2013.01); *C09J 2301/122* (2020.08); *C09J 2301/302* (2020.08); *C09J 2301/408* (2020.08); *C09J 2433/00* (2013.01)

(58) Field of Classification Search
None
See application file for complete search history.

(56) References Cited

U.S. PATENT DOCUMENTS

| 2003/0114560 A1 | 6/2003 | Yang et al. |
| 2005/0123831 A1 | 6/2005 | Michot et al. |
| 2006/0279922 A1 | 12/2006 | Cho et al. |
| 2008/0176976 A1* | 7/2008 | Amano .................. C09J 133/06 |
| | | 524/86 |
| 2009/0317635 A1* | 12/2009 | Amano ...................... C09J 9/02 |
| | | 428/355 AC |
| 2011/0068306 A1* | 3/2011 | Liao .................... C08G 18/7621 |
| | | 252/585 |
| 2011/0229769 A1 | 9/2011 | Ihara et al. |
| 2012/0202055 A1* | 8/2012 | Kataoka ..................... C09J 9/02 |
| | | 428/336 |
| 2014/0220264 A1 | 8/2014 | Park et al. |

FOREIGN PATENT DOCUMENTS

| CN | 104011162 A | 8/2014 |
| CN | 104893624 A | 9/2015 |
| JP | H05140519 A | 6/1993 |
| KR | 20040030919 A | 4/2004 |
| KR | 20060128659 A | 12/2006 |
| KR | 20120076817 A | 7/2012 |
| KR | 20120133973 A | 12/2012 |
| KR | 20130072180 A | 7/2013 |
| KR | 20140090292 A | 7/2014 |
| WO | 2013095064 A1 | 6/2013 |
| WO | 2014038810 A1 | 3/2014 |

OTHER PUBLICATIONS

EIC structure search (claimed imidazole compound) (Year: 2010).*
Chinese Search Report for Application No. 201680078356.4 dated Aug. 29, 2019, pp. 1-2.
Search report from International Application No. PCT/KR2016/014281, dated Mar. 9, 2017.

* cited by examiner

*Primary Examiner* — Frank D Ducheneaux
(74) *Attorney, Agent, or Firm* — Lerner, David, Littenberg, Krumholz & Mentlik, LLP

(57) ABSTRACT

The present application relates to a pressure-sensitive adhesive composition, a protective film, an optical element and a display device. The pressure-sensitive adhesive composition of the present application has excellent storage stability, exhibits an appropriate low-speed and high-speed peel forces after the cross-linked structure is formed, and has excellent balance of both. Furthermore, the pressure-sensitive adhesive formed by the pressure-sensitive adhesive composition does not leave contaminants in the adherend after peeling, while exhibiting re-detachability. Accordingly, when the pressure-sensitive adhesive composition is applied to, for example, a protective film, it is also advantageous in terms of high-speed processes by being easily peeled off upon high-speed peeling as well as it exhibits an excellent protective effect, thereby being capable of exhibiting excellent antistatic characteristics.

9 Claims, No Drawings

PRESSURE-SENSITIVE ADHESIVE COMPOSITION

CROSS REFERENCE TO RELATED APPLICATIONS

The present application is a national phase entry under 35 U.S.C. § 371 of International Application No. PCT/KR2016/014281 filed on Dec. 7, 2016, which claims priority from Korean Patent Application No. 10-2015-0173247 filed on Dec. 7, 2015, the disclosures of which are incorporated herein by reference.

TECHNICAL FIELD

The present application relates to a pressure-sensitive adhesive composition, an optical element protective film, an optical element and a display device.

BACKGROUND ART

A protective film may be used to prevent rubbish such as dust from adhering to optical elements such as a polarizing plate, other plastic products, home appliances or automobiles, and the like or scratches or the like from occurring. The protective film is required to have adequate peel force and antistatic characteristics.

For example, when a protective film is peeled at a high speed for use of a product or for assembling other products, it is required that the peel force (hereinafter, referred to as "high-speed peel force") be relatively low. On the other hand, the peel force (hereinafter referred to as "low-speed peel force") at the time of peeling at a slow speed may be relatively high to exhibit an appropriate protective function.

In addition, due to static electricity generated mainly at the time of peeling off the protective film, foreign materials such as dust may be sucked and in the case of electronic products, electrostatic breakdown or malfunction of devices may be caused. In particular, recently, while components are integrated due to spread of computers and multi-functionalization of liquid crystal TVs or mobile phones, the problems caused by static electricity are being magnified more and more.

Accordingly, efforts have been made to impart an antistatic function to the pressure-sensitive adhesive contained in the protective film.

For example, in Patent Document 1, there is an attempt to suppress the generation of static electricity by blending an ethylene oxide modified dioctyl phthalate plasticizer with a pressure-sensitive adhesive. Also, in Patent Document 2, an organic salt has been added to a pressure-sensitive adhesive, and in Patent Document 3, a metal salt and a chelating agent have been blended in a pressure-sensitive adhesive. However, according to the above methods, contamination due to transfer of the pressure sensitive adhesive component into a product to be protected occurs, or it is difficult to suppress the static electricity generated at the initial stage, and especially the low-speed peel force, which is important for the protective function, becomes excessively low.

PRIOR ART DOCUMENTS

Patent Documents (Patent Document 1) Japanese Laid-Open Patent Publication No. 1993-140519

(Patent Document 2) Korean Laid-Open Patent Publication No. 2004-0030919

(Patent Document 3) Korean Laid-Open Patent Publication No. 2006-0128659

DISCLOSURE

Technical Problem

The present application provides a pressure-sensitive adhesive composition, an optical element protective film, an optical element, and a display device.

Technical Solution

An exemplary pressure-sensitive adhesive composition may comprise a polymer and an ionic compound. As the polymer, a polymer can be used, which can exhibit appropriate pressure-sensitive adhesion performance, antistatic characteristics and peeling properties, and can prevent contamination to an adherend after peeling of the pressure-sensitive adhesive, and for example, an acrylic polymer can be used. The acrylic polymer means a polymer containing, as a monomer unit, an acrylic monomer as a main component. Here, the acrylic monomer means acrylic acid or methacrylic acid or a derivative thereof (e.g., acrylic acid ester or methacrylic acid ester). In this specification, the fact that a certain component is included as a main component in another component may mean a case that the component included as the main component has a ratio of 55% or more, 60% or more, 65% or more, 70% or more, 75% or more, 80% or more, or 85% or more on the basis of weight. In this specification, the term monomer means all kinds of compounds capable of forming a polymer through polymerization. Furthermore, the fact that the polymer is a polymer of a monomer mixture containing a certain monomer may mean that the monomer contained in the monomer mixture is included in the polymer as a polymerized unit or a monomer unit. In addition, the fact to be included as a polymerized unit or a monomer unit may mean a state in which the monomer is polymerized and included in a skeleton such as a side chain or a main chain of the polymer.

The acrylic polymer may be a polymer of a monomer mixture of an alkyl (meth)acrylate; first and second monomers to be described below; and a compound of Formula 2.

Here, as the alkyl (meth)acrylate, an alkyl (meth)acrylate having an alkyl group having 1 to 14 carbon atoms, 1 to 12 carbon atoms, 4 to 12 carbon atoms, or 6 to 12 carbon atoms can be used in consideration of cohesive force, glass transition temperature or tackiness of a pressure-sensitive adhesive. The alkyl (meth)acrylate may be contained as a main component in the monomer mixture. Here, the fact to be contained as a main component may mean that the alkyl (meth)acrylate is contained in the monomer mixture in an amount of 55% or more or 60% or more on the basis of weight. The weight ratio of the alkyl (meth)acrylate in the monomer mixture may be 100% or less, 90% or less, or 80% or less. The monomer may be exemplified by methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylated, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, and the like, and one or two or more of the foregoing may be included in the monomer mixture.

The monomer mixture may further comprise a hydroxy group-containing monomer. The monomer may provide a hydroxy group to the polymer.

As the hydroxy group-containing monomer, for example, a monomer represented by Formula 1 below can be exemplified.

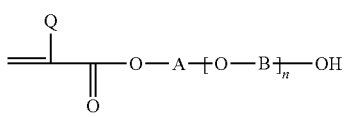

[Formula 1]

In Formula 1, Q is hydrogen or an alkyl group, for example, an alkyl group having 1 to 4 carbon atoms or a methyl group, A and B are each independently an alkylene group, and n is any number, for example, a number of 0 to 10.

In this specification, unless otherwise specified, the alkylene group or alkylidene group is an alkylene group or alkylidene group having 1 to 20 carbon atoms, 1 to 16 carbon atoms, 1 to 12 carbon atoms, 1 to 8 carbon atoms, or 1 to 4 carbon atoms is. The alkylene group or alkylidene group may be linear, branched or cyclic. The alkylene group or alkylidene group may be optionally substituted with one or more substituents.

In Formula 1, when two or more [—O—B—] units are present, the number of carbon atoms of B in the units may be the same or different In Formula 1, A and B may be, for example, each independently a linear alkylene group.

The compound of Formula 1 may be exemplified by 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, and the like, but is not limited thereto.

In one example, as the hydroxy group-containing monomer, two monomers having different carbon numbers present in the side chain may be used.

For example, the monomer mixture may comprise a first monomer represented by Formula 1, wherein the carbon number of the alkylene groups present in A and B of Formula 1 is in a range of 1 to 3, and a second monomer represented by Formula 1, wherein the carbon number of the alkylene groups present in A and B of Formula 1 is 4 to 16, 4 to 12, 4 to 8, or 4 to 6.

Here, when calculating the carbon number in order to distinguish the first and second monomers, only the carbon number of the alkylene group formed in a straight chain form is considered. That is, in the case of A in Formula 1, when the oxygen atom on the left side of A and the oxygen atom in parentheses are linked, or when n is 0, the carbon number of the straight chain type alkylene group linking the hydroxy group to the oxygen atom on the left side of A is considered, and in the case of B, the carbon number of the straight chain type alkylene group linking the oxygen atom on the left side of B to the right hydroxy group is considered. Therefore, for example, when the carbon-containing substituent is substituted for A and B, the carbon number of the substituent is not considered. As such, a pressure-sensitive adhesive having particularly excellent peel force characteristics, that is, excellent balance of high-speed and low-speed peel forces, can be provided through the polymerized unit of two hydroxy group monomers.

The weight ratio of the first and second monomers in the monomer mixture can be adjusted in order to secure the peeling properties, that is, the balance of excellent low-speed and high-speed peel forces, while ensuring all properties such as pressure-sensitive adhesion performance in an appropriate range.

In the monomer mixture, the first monomer may be included in a ratio of about 0.1 to 30 parts by weight, about 0.1 to 25 parts by weight, about 0.1 to 20 parts by weight, about 0.1 to 15 parts by weight, about 0.1 to 10 parts by weight, about 0.1 to 5 parts by weight, about 0.5 to 5 parts by weight, about 1 to 5 parts by weight, or about 2 to 5 parts by weight, relative to 100 parts by weight of the alkyl (meth)acrylate. Also, in the monomer mixture, the second monomer may be included in a ratio of about 0.1 to 10 parts by weight, about 0.1 to 5 parts by weight, about 1 to 5 parts by weight, about 1.5 to 5 parts by weight, about 1.5 to 4 parts by weight, about 1.5 to 3 parts by weight, or about 1.5 to 2.5 parts by weight, relative to 100 parts by weight of the alkyl (meth)acrylate. In this specification, the unit part by weight may mean a weight ratio between the components, unless otherwise specified. The ratio (A/B) of the weight (A) of the first monomer to the weight (B) of the second monomer in the monomer mixture may be 1 or more. In another example, the ratio may be about 1 to 10, about 1 to 8, or about 1 to 6 or so. Within the above range, it is possible to provide a pressure-sensitive adhesive not only exhibiting appropriate antistatic characteristics, but also exhibiting the balance of appropriate high-speed and low-speed peel forces, without leaving contaminants upon peeling.

The monomer mixture also comprises a compound of Formula 2 below.

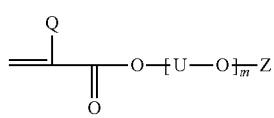

[Formula 2]

In Formula 2, Q is hydrogen or an alkyl group, for example, an alkyl group having 1 to 4 carbon atoms, or a methyl group, U is an alkylene group, Z is hydrogen, an alkyl group or an aryl group, and m is any number, a number of 1 to 20.

In Formula 2, when two or more [—U—O—] units are present, the carbon number of U in the units may be the same or different.

In Formula 2, m may be a number in the range of, for example, 1 to 16, 1 to 12, 2 to 12, or 2 to 10. Within this range, it is possible to maintain polymerization efficiency upon preparing the polymer and crystallinity of the polymer in an appropriate range, and to impart appropriate conductivity to the pressure-sensitive adhesive.

In another example, Q in Formula 2 may be an alkyl group, for example, an alkyl group having 1 to 4 carbon atoms. If the compound, in which Q is an alkyl group, is used, it may be advantageous that the protective film is easily removed without leaving any residue or stain on the adherend, when the pressure-sensitive adhesive composition is applied to a protective film or the like.

In this specification, the term aryl group may mean a monovalent residue derived from a compound comprising a benzene ring or a structure in which two or more benzene rings are linked or two or more benzene rings are condensed or bound while sharing one or two or more carbon atoms, and a derivative thereof, unless otherwise specified. The aryl group may be, for example, an aryl group having 6 to 25 carbon atoms, 6 to 22 carbon atoms, 6 to 16 carbon atoms, or 6 to 13 carbon atoms. Such an aryl group can be exemplified by a phenyl group, a phenylethyl group, a phenylpropyl group, a benzyl group, a tolyl group, a xylyl group or a naphthyl group, and the like.

The compound of Formula 2 may include one or two or more of alkoxy dialkyleneglycol (meth)acrylic acid ester, alkoxy trialkyleneglycol (meth)acrylic acid ester, alkoxy tetraalkyleneglycol (meth)acrylic acid ester, aryloxy dialkyleneglycol (meth)acrylic acid ester, aryloxy trialkyleneglycol (meth)acrylic acid ester, aryloxy tetraalkyleneglycol (meth)acrylic acid ester and polyalkyleneglycol monoalkyl ether (meth)acrylic acid ester, and the like, but is not limited thereto. Here, as the alkoxy, for example, alkoxy of 1 to 20 carbon atoms, 1 to 16 carbon atoms, 1 to 12 carbon atoms or 1 to 4 carbon atoms may be exemplified, and specifically, a methoxy group or an ethoxy group may be exemplified. Also, as the alkyleneglycol herein, alkyleneglycol of 1 to 20 carbon atoms, 1 to 16 carbon atoms, 1 to 12 carbon atoms or 1 to 4 carbon atoms may be exemplified, and for example, ethyleneglycol or propyleneglycol may be exemplified, and as the aryloxy herein, aryloxy of 6 to 24 carbon atoms or 6 to 12 carbon atoms, such as phenoxy, may be exemplified.

When the compound of Formula 2 is contained in the monomer mixture, the ratio may be about 0.1 to 30 parts by weight, about 0.1 to 25 parts by weight, about 0.1 to 20 parts by weight, about 0.1 to 15 parts by weight, about 0.1 to about 10 parts by weight, about 0.1 to 8 parts by weight, about 0.5 to 8 parts by weight, about 1 to 8 parts by weight, about 2 to 8 parts by weight, about 3 to 8 parts by weight, about 4 to 8 parts by weight or about 4 to 7 parts by weight, relative to 100 parts by weight of the alkyl (meth)acrylate.

In the above range, the pressure-sensitive adhesive can exhibit appropriate antistatic characteristics, and it is possible to effectively prevent contamination into the adherend, when the pressure-sensitive adhesive is peeled off.

For control of glass transition temperature, and the like, if necessary, the monomer mixture may further comprise a known monomer used in producing a polymer of a pressure-sensitive adhesive, for example, a carboxyl group-containing monomer such as (meth)acrylic acid, 2-(meth)acryloyloxy acetic acid, 3-(meth)acryloyloxy propionic acid, 4-(meth)acryloyloxy butyl acid, an acrylic acid dimer, itaconic acid, maleic acid and maleic anhydride; a monomer having an isocyanate group, a monomer having a glycidyl group such as glycidyl (meth)acrylate, or a radical polymerizable monomer such as stilbene.

The polymer may be prepared by applying the above-described monomer mixture to a polymerization method such as solution polymerization, photo polymerization, bulk polymerization, suspension polymerization or emulsion polymerization. Through the polymerization, the monomers contained in the monomer mixture can be polymerized to form the polymerized units.

The pressure-sensitive adhesive composition may comprise the above-described polymer as a main component. That is, the pressure-sensitive adhesive composition may comprise at least about 55%, at least about 60%, at least about 65%, at least about 70%, at least about 75%, at least about 80%, at least about 85%, at least about 90% or at least about 95% of the polymer on the basis of weight of the solid content. The weight ratio (based on the solid content) of the polymer in the pressure-sensitive adhesive composition may be about 100% or less, less than 100%, or about 99% or less.

The pressure-sensitive adhesive composition may comprise an ionic compound as an antistatic agent. As the ionic compound, a compound containing an imidazole-based anion can be used. As the imidazole-based anion, for example, an anion represented by Formula 3 below can be exemplified.

[Formula 3]

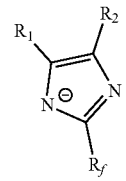

In Formula 3, $R_f$ is a haloalkyl group, and $R_1$ and $R_2$ are each independently a hydrogen atom, an alkyl group, a haloalkyl group or a cyano group, provided that at least one of $R_1$ and $R_2$ is a cyano group.

In Formula 3, the alkyl group or haloalkyl group may be an alkyl group or haloalkyl group having 1 to 20 carbon atoms, 1 to 16 carbon atoms, 1 to 12 carbon atoms, 1 to 8 carbon atoms, or 1 to 4 carbon atoms.

Here, the haloalkyl group is an alkyl group substituted with at least one halogen atom, and as a suitable example, a perfluoroalkyl group can be exemplified.

In Formula 3, $R_1$ and $R_2$ are each independently a hydrogen atom, an alkyl group, a haloalkyl group or a cyano group, provided that at least one of the two groups is a cyano group, and suitably, both of the two groups may be cyano groups.

Such an anion shows an electrically stable form due to the presence of an aromatic ring structure and an electrophilic group, and thus, the antistatic characteristic can be effectively imparted to the pressure-sensitive adhesive.

The ionic compound may comprise a cation, for example, a metal cation or an organic cation, together with the above-described anion. The metal cation may be an alkali metal cation or an alkaline earth metal cation and specifically may be exemplified by one or two or more of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), and the like, and for example, one or two or more of a lithium ion, a sodium ion, a potassium ion, a magnesium ion, a calcium ion and a barium ion can be used, or a lithium ion can be used in consideration of ion stability and mobility.

Also, the organic cation can be exemplified by a quaternary ammonium such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium, pyridinium, imidazolium, pyrolidinium or piperidinium, and the like, but is not limited thereto.

The content of the ionic compound in the pressure-sensitive adhesive composition is limited to 0.001 to 5 parts by weight, 0.01 to 5 parts by weight or 0.1 to 5 parts by weight, relative to 100 parts by weight of the polymer. If the ratio of the ionic compound exceeds 5 parts by weight, the peel force of the pressure-sensitive adhesive greatly increases, so that there is a problem that the use of the pressure-sensitive adhesive is limited.

The pressure-sensitive adhesive composition may further comprise a cross-linking agent, which may react with the cross-linking point of the polymer to realize a cross-linked structure.

As the cross-linking agent, for example, an aliphatic isocyanate cross-linking agent can be used. When such a cross-linking agent realizes a cross-linked structure with the polymer, that is, a polymer containing two or more hydroxy group-containing monomers, it is possible to realize a pressure-sensitive adhesive having the required antistatic characteristics together with appropriate low-speed and high-speed peel forces. For example, as the cross-linking agent, a cross-linking agent comprising an aliphatic cyclic isocyanate compound and/or an aliphatic acyclic isocyanate compound can be used. Here, the term aliphatic cyclic isocyanate compound may mean an isocyanate compound comprising a cyclic structure, but comprising a cyclic structure in which the structure does not correspond to an aromatic ring, the aliphatic acyclic isocyanate compound may mean, for example, a linear or branched aliphatic isocyanate compound. Here, the aliphatic cyclic isocyanate compound may be exemplified by an isocyanate compound such as isophorone diisocyanate or methylene dicyclohexyl diisocyanate or cyclohexane diisocyanate, or a derivative such as a dimer or trimer thereof or a reactant of any one of the foregoing with a polyol (e.g., trimethylol propane), and the aliphatic acyclic isocyanate compound may be exemplified by an alkylene diisocyanate compound having 1 to 20 carbon atoms, 1 to 16 carbon atoms, 1 to 12 carbon atoms or 1 to 8 carbon atoms such as hexamethylene diisocyanate, a derivative such as a dimer or trimmer thereof or a reactant of any one of the foregoing with a polyol (e.g., trimethylol propane), and the like, but are not limited thereto.

Here, when the aliphatic cyclic isocyanate compound and the aliphatic acyclic isocyanate compound are used together, the ratio is not particularly limited, which may be appropriately selected as needed. Typically, 1 part by weight to 500 parts by weight or 20 parts by weight to 300 parts by weight of the aliphatic acyclic isocyanate compound may be included in the cross-linking agent, relative to 100 parts by weight of the aliphatic cyclic isocyanate compound. As such a cross-linking agent, that is, the cross-linking agent comprising the aliphatic cyclic isocyanate compound and the aliphatic acyclic isocyanate compound, commercially available cross-linking agents may also be used, and an example thereof includes MHG-80B and Duranate P manufactured by Asahi, or NZ-1 manufactured by BAYER, etc.

As the cross-linking agent, in addition to the foregoing, if necessary, a known cross-linking agent, such as an epxy cross-linking agent such as ethyleneglycol diglycidylether, triglycidylether, trimethylolpropane triglycidylether, N,N,N',N'-tetraglycidyl ethylenediamine or glycerin diglycidylether; an aziridine cross-linking agent such as N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) or tri-1-aziridinyl-phosphine oxide or a metal chelate cross-linking agent, which is a compound that a polyvalent metal such as aluminum, iron, zinc, tin, titanium, antimony, magnesium and/or vanadium is coordinated to acetyl acetone or acetyl acetate, and the like, can be used together.

The pressure-sensitive adhesive composition may comprise 0.01 to 10 parts by weight, about 0.1 to 10 parts by weight, about 0.5 to 10 parts by weight, about 1 to 10 parts by weight, about 3 to 10 parts by weight, or about 5 to 10 parts by weight of the cross-linking agent, relative to 100 parts by weight of the polymer. In such a range, an appropriate cross-linked structure can be realized, the low speed and high speed peel forces of the pressure-sensitive adhesive can be adjusted to a desired range, and contamination of the pressure-sensitive adhesive into the adherend after peeling can also be prevented.

The pressure-sensitive adhesive composition may also further comprise one or more additives selected from the group consisting of a silane coupling agent, a tackifier, a coordinating compound capable of forming a coordination bond with the antistatic agent, a photoinitiator, a multifunctional acrylate, an epoxy resin, a cross-linking agent, an ultraviolet stabilizer, an antioxidant, a colorant, a reinforcing agent, a filler, a defoaming agent, a surfactant and a plasticizer in the range without affecting the effectiveness of the application.

The pressure-sensitive adhesive composition may have, in a state where the cross-linked structure is realized, a low-speed peel force of about 1 gf/25 mm to 40 gf/25 mm, 1 gf/25 mm to 30 gf/25 mm, 1 gf/25 mm to 20 gf/25 mm or 1 gf/25 mm to 10 gf/25 mm or so and may have a high-speed peel force of 10 gf/25 mm to 300 gf/25 mm, 10 gf/25 mm to 250 gf/25 mm, 10 gf/25 mm to 200 gf/25 mm, 10 gf/25 mm to 150 gf/25 mm, 10 gf/25 mm to 100 gf/25 mm or so, about 20 gf/25 mm to 100 gf/25 mm, about 30 gf/25 mm to 100 gf/25 mm, about 40 gf/gf/25 mm to 100 gf/25 mm, or about 50 gf/25 mm to 100 gf/25 mm or so, for an adherend having a surface energy of 30 mN/m.

Here, the term low-speed peel force may be, for example, a peel force measured at a peel angle of 180 degrees and a peel rate of 0.3 m/min, and the high-speed peel force may be a peel force measured at a peel angle of 180 degrees and a peel rate of 30 m/min.

Specifically, each of the peel forces may be one measured with the above-described peel angle and peel rate after attaching a pressure-sensitive adhesive composition, in which a cross-linked structure is realized, to an adherend having a surface energy of 30 mN/m or less and maintaining it at a temperature of 23° C. and a relative humidity of 65% for 24 hours. A specific method of measuring each of the peel forces is described in the following examples.

The method of measuring the surface energy of the adherend is not particularly limited, and a known surface energy measurement method can be applied. For example, by measuring the contact angle of the adherend, the surface energy may be determined therefrom, or may be measured using a known surface energy measuring instrument. The surface energy of the adherend may be, for example, 10 mN/m to 30 mN/m or so.

The pressure-sensitive adhesive composition may have a ratio (H/L) of the high-speed peel force (H) to the low-speed peel force (L), of 1 to 30, 1 to 25, 1 to 20, 5 to 20, about 10 to 20 or about 13 to 17 or so.

If such low-speed peel force, high-speed peel force and/or peeling electrostatic discharge are secured, it can be easily peeled at high speed, while exhibiting an appropriate protection function for the adherend and minimizing the induction of static electricity.

In the physical properties described herein, when the temperature at the time of measurement affects the physical properties, the relevant physical property means a physical property measured at room temperature, unless otherwise specified. The term room temperature may mean a natural intact temperature without warming or cooling, and for example, may mean any one temperature in a range of about 15° C. to 30° C.

The present application also relates to a pressure-sensitive adhesive sheet. The pressure-sensitive adhesive sheet may be, for example, a protective film, specifically a protective film for an optical element.

For example, the pressure-sensitive adhesive sheet can be used as a protective film for an optical element such as a polarizing plate, a polarizer, a polarizer protective film, a retardation film, a viewing angle compensation film and a luminance enhancement film. In this specification, the terms polarizer and polarizing plate designate objects that are distinguished from each other. That is, the polarizer designates a film, sheet or element itself exhibiting a polarization function, and the polarizing plate means an optical element comprising other components together with the polarizer. Other components that can be included in the optical element together with the polarizer can be exemplified by a polarizer protective film or a retardation layer, and the like, but is not limited thereto.

The pressure-sensitive adhesive sheet may comprise, for example, a surface protective base film and a pressure-sensitive adhesive layer present on one side of the base film. The pressure-sensitive adhesive layer may comprise, for example, as the pressure-sensitive adhesive composition, a cross-linked pressure-sensitive adhesive composition, that is, a pressure-sensitive adhesive composition in which a cross-linked structure is realized.

The pressure-sensitive adhesive composition exhibits a relatively high low-speed peel force and a relatively low high-speed peel force after the cross-linked structure is implemented, and simultaneously has excellent balance of both of the peel forces and superior endurance reliability, workability, transparency and antistatic property. Accordingly, the protective film may be effectively used as a surface protective film for protecting the surface of an optical element such as a polarizing plate, a retardation plate, an optical compensation film, a reflection sheet and a luminance enhancement film used for various optical devices or parts, or display devices or parts, for example, LCD, but the use is not limited to the protective film.

As the surface protective base film, a general film or sheet known in this field can be used. For example, it may include a plastic film such as a polyester film, for example, polyethylene terephthalate or polybutylene terephthalate, a polytetrafluoroethylene film, a polyethylene film, a polypropylene film, a polybutene film, a polybutadiene film, a poly (vinyl chloride) film or a polyimide film. Such a film may be composed of a single layer, or also laminated by two or more layers, and may also further comprise optionally a functional layer such as an antifouling layer or an antistatic layer. Furthermore, from the viewpoint of improving adhesiveness of the base material, a surface treatment such as a primer treatment may also be performed on one or both sides of the base material.

The base film has a thickness appropriately selected depending on the application, which is not particularly limited, and may be generally formed to a thickness of 5 to 500 μm or 10 to 100 μm.

The thickness of the pressure-sensitive adhesive layer included in the pressure-sensitive adhesive sheet is not particularly limited, and may be, for example, 2 μm to 100 μm or from 5 μm to 50 μm.

The method for forming the pressure-sensitive adhesive layer is not particularly limited, and for example, a method of applying a pressure-sensitive adhesive composition or a coating solution prepared therefrom on a base film or the like and curing it, or first applying a pressure-sensitive adhesive composition or a coating liquid on the surface of a detachable base material, curing it, and transferring it to the base film again, and the like can be used.

The process of forming the pressure-sensitive adhesive layer is preferably performed after sufficiently removing the bubble-inducing component such as the volatile component or the reaction residue in the pressure-sensitive adhesive composition or the coating liquid. Accordingly, it is possible to prevent problems that the cross-linking density or molecular weight of the pressure-sensitive adhesive is too low to lower the elastic modulus, and bubbles existing between the glass plate and the pressure-sensitive adhesive layer at a high temperature state are enlarged to form scattering bodies therein, and the like.

Furthermore, a method of curing the pressure-sensitive adhesive composition in the above process is also not particularly limited, and for example, may be performed through an appropriate aging process such that the polymer and the cross-linking agent included in the composition can be reacted, or through light irradiation, for example, ultraviolet irradiation, capable of inducing activation of a photoinitiator inside.

The pressure-sensitive adhesive layer may have, for example, a gel content of 80% to 99% or so. The gel content can be calculated, for example, by Equation 1 below.

$$\text{Gel content} = B/A \times 100 \qquad \text{[Equation 1]}$$

In Equation 1, A represents a mass of the pressure-sensitive adhesive, and B represents a dry mass of insoluble fractions recovered after immersing the pressure-sensitive adhesive in ethyl acetate at room temperature for 48 hours.

The present application also relates to an optical element. An exemplary optical element may comprise an optical element and the pressure-sensitive adhesive sheet attached to the surface of the optical element. For example, the pressure-sensitive adhesive layer of the pressure-sensitive adhesive sheet is attached to the surface of the optical element, whereby the optical element can be protected by the surface protective base film.

As the optical element included in the optical element, for example, a polarizer, a polarizing plate, a polarizer protective film, a retardation layer or a viewing angle compensation layer, and the like can be exemplified.

Here, as the polarizer, for example, general types known in the art such as a polyvinyl alcohol polarizer and the like can be adopted without limitation.

A polarizer is a functional film or sheet capable of extracting only light oscillating in one direction from light incident while oscillating in various directions. Such a polarizer may be, for example, a form in which a dichroic dye is adsorbed and oriented on a polyvinyl alcohol-based resin film. The polyvinyl alcohol-based resin constituting the polarizer can be obtained by, for example, performing gelation of a polyvinyl acetate-based resin. In this case, the usable polyvinyl acetate-based resin may include not only homopolymers of vinyl acetate but also copolymers of vinyl acetate and other monomers copolymerizable therewith. Here, an example of the monomer copolymerizable with vinyl acetate may include one or a mixture of two or more of unsaturated carboxylic acids, olefins, vinyl ethers, unsaturated sulfonic acids, and acrylamides having an ammonium group, but is not limited thereto. The polyvinyl alcohol-based resin may have a gelation degree of, typically, about 85 mol % to 100 mol %, preferably, 98 mol % or more. The polyvinyl alcohol-based resin may also be further modified, and for example, polyvinyl formal or polyvinyl acetal modified into aldehydes, and the like may also be used. The polyvinyl alcohol-based resin may have a polymerization degree of, typically, 1,000 to 10,000 or so, preferably, 1,500 to 5,000 or so.

A polyvinyl alcohol-based resin may be formed into a film and used as a discotic film of the polarizer. The film-forming method of the polyvinyl alcohol-based resin is not particularly limited, and a general method known in this field can be used. The thickness of the discotic film formed of a polyvinyl alcohol-based resin is not particularly limited, and for example, can be appropriately controlled within a range of 1 µm to 150 µm. The thickness of the discotic film can be controlled to 10 µm or more in consideration of easiness of stretching and the like. The polarizer may be produced through a process of stretching the above polyvinyl alcohol-based resin film (e.g., uniaxially stretching), a process of dyeing the polyvinyl alcohol-based resin film with a dichroic dye and adsorbing the dichroic dye, a process of treating the polyvinyl alcohol-based resin film adsorbed by the dichroic dye with a boric acid aqueous solution and a process of washing after treating with the boric acid aqueous solution, and the like. Here, as the dichroic dye, iodine or a dichroic organic dye, and the like may be used.

The polarizing plate may comprise, for example, the polarizer; and other optical films attached to one or both sides of the polarizer. Here, the other optical films may be exemplified by the above-described polarizer protective film or a retardation layer, a viewing angle compensation layer, an antiglare layer, and the like.

Here, the polarizer protective film is a protective film for a polarizer as a concept distinct from a protective film containing the pressure-sensitive adhesive layer. The polarizer protective film may be formed of a multi-layer film in which a protective film is laminated, which is composed of, for example, a cellulose-based film such as triacetylcellulose; an acrylic film; a polyester-based film such as a polycarbonate film or a polyethylene terephthalate film; a polyether sulfone-based film; and/or a polyolefin-based film such as a polyethylene film, a polypropylene film, or a polyolefin film having a cyclo or norbornene structure or an ethylene propylene copolymer, and the like. The thickness of the protective film is also not particularly limited, and it can be formed to a usual thickness.

In the optical element, a surface treatment layer may be present on the surface of the optical element protected by the protective film. The surface treatment layer may have, for example, a surface energy of 30 mN/m or less. That is, in the optical element, the surface treatment layer having a surface energy of 30 mN/m or less may be formed on the surface of the optical element protected by the protective film, and the pressure-sensitive adhesive layer of the protective film may be attached to the surface treatment layer.

The surface treatment layer may be exemplified by a high hardness layer, a glare prevention layer such as an AG (anti-glare) layer or an SG (semi-glare) layer or a low reflection layer such as an AR (anti reflection) layer or an LR (low reflection) layer, and the like.

The high hardness layer may be a layer having a pencil hardness of 1H or more, or 2H or more under a load of 500 g. The pencil hardness can be measured, for example, according to ASTM D 3363 standard using a pencil lead specified in KS G2603.

The high hardness layer may be, for example, a resin layer having a high hardness. The resin layer may comprise, for example, a room temperature curable, moisture curable, thermosetting or active energy ray curable resin composition in a cured state. In one example, the resin layer may comprise a thermosetting or active energy ray-curable resin composition, or an active energy ray-curable resin composition in a cured state. In the description of the high hardness layer, the "cured state" may mean a case where the components contained in each of the resin compositions are subjected to a cross-linking reaction or a polymerization reaction to convert the resin compositions into a hard state. In addition, the room temperature curing type, moisture curing type, thermosetting type or active energy ray curable type resin composition may mean a composition that the cured state can be induced at room temperature or can be induced in the presence of appropriate moisture, or by application of heat or irradiation of active energy rays.

In this field, various resin compositions capable of satisfying the pencil hardness within the above-mentioned range in the cured state are known, and an average skilled person can easily select a suitable resin composition.

In one example, the resin composition may include an acrylic compound, an epoxy compound, a urethane compound, a phenol compound or a polyester compound, and the like as a main component. Here, the "compound" may be a monomeric, oligomeric or polymeric compound.

In one example, as the resin composition, an acrylic resin composition having excellent optical properties such as transparency and excellent resistance to yellowing, for example, an active energy ray-curable acrylic resin composition can be used.

The active energy ray-curable acrylic composition may comprise, for example, an active energy ray-polymerizable polymer component and a reactive diluting monomer.

The polymer component may be exemplified by components known as so-called active energy linear polymerizable oligomers in the industry such as urethane acrylate, epoxy acrylate, ether acrylate or ester acrylate, or polymeric substances of mixtures comprising monomers such as (meth)acrylic acid ester monomers. Here, the (meth)acrylic acid ester monomer may be exemplified by alkyl (meth)acrylate, (meth)acrylate having an aromatic group, heterocyclic (meth)acrylate or alkoxy (meth)acrylate, and the like. Various polymer components for preparing active energy ray-curable compositions are known in this field and such compounds may be selected as needed.

The reactive diluting monomer which can be contained in the active energy ray-curable acrylic composition can be exemplified by a monomer having one or two or more active energy ray-curable functional groups such as an acryloyl group or a methacryloyl group. As the reactive diluting monomer, for example, the above (meth)acrylic acid ester monomer or a multifunctional acrylate, and the like can be used.

The selection of the above-mentioned components for preparing the active energy ray-curable acrylic composition or a blending ratio of the selected components, and the like are not particularly limited and can be adjusted in consideration of the hardness and other physical properties of the desired resin layer.

As the glare prevention layer such as the AG layer or the SG layer, for example, a resin layer on which a concavo-convex surface is formed or a resin layer containing particles, in which the particles have a refractive index different from that of the resin layer, can be used.

Here, as the resin layer, for example, a resin layer used for forming the high hardness layer may be used. In the case of forming the glare prevention layer, it is not necessary to adjust the components of the resin composition so that the resin layer necessarily exhibits high hardness, but a resin layer may be formed so as to exhibit high hardness.

Here, the method of forming the concavo-convex surface on the resin layer is not particularly limited. For example, the concavo-convex structure can be realized by curing the resin composition in a state in which the coating layer of the resin composition is brought into contact with a mold having a desired concavo-convex structure or by blending particles having an appropriate particle diameter in the resin composition, followed by coating and curing.

The glare prevention layer may also be formed using particles having a refractive index different from that of the resin layer.

In one example, the particles may have, for example, a refractive index difference with the resin layer of 0.03 or less or 0.02 to 0.2. If the refractive index difference is too small, haze is hardly caused, and on the contrary, if it is too large, a lot of scattering occurs in the resin layer to increase haze, but deterioration of light transmittance or contrast characteristics, and the like may be induced, so that appropriate particles can be selected in consideration of this fact.

The shape of the particles contained in the resin layer is not particularly limited and may be, for example, spherical, elliptical, polyhedral, amorphous or other shapes. The particles may have an average diameter of 50 nm to 5,000 nm. In one example, as the particles, particles having irregularities on the surface thereof can be used. Such particles may have an average surface roughness (Rz) of 10 nm to 50 nm or 20 nm to 40 nm, and/or a maximum height of irregularities formed on the surface of about 100 nm to 500 nm or 200 nm to 400 nm, and a width between the irregularities of 400 nm to 1,200 nm or 600 nm to 1,000 nm. Such particles have excellent compatibility with the resin layer or dispersibility therein.

As the particles, various inorganic or organic particles can be exemplified. The inorganic particles can be exemplified by silica, amorphous titania, amorphous zirconia, indium oxide, alumina, amorphous zinc oxide, amorphous cerium oxide, barium oxide, calcium carbonate, amorphous barium titanate or barium sulfate, and the like, and the organic particles can be exemplified by particles comprising a cross-linked product or a non-cross-linked product of an organic material such as an acrylic resin, a styrene resin, a urethane resin, a melamine resin, a benzoguanamine resin, an epoxy resin or a silicone resin, but are not limited thereto.

The concavo-convex structure formed on the resin layer or the content of the particles is not particularly limited. The shape of the concavo-convex structure or the content of the particles may be controlled such that in the case of the AG layer, the haze of the resin layer is about 5% to 15%, 7% to 13%, or about 10% or so and in the case of the SG layer, the haze is about 1% to 3% or so. The haze can be measured according to the manufacturer's manual using a hazemeter such as HR-100 or HM-150 from Sepung.

The low reflection layer such as the AR layer or the LR layer can be formed by coating a low refractive material. The low refractive material capable of forming the low reflection layer is variously known, and all these materials can be suitably selected and used for the optical element. The low reflection layer can be formed to have a reflectance of about 1% or less through coating of the low refractive material.

For forming the surface treatment layer, materials known in Korean Laid-Open Patent Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 or 2009-0049557 can also be used.

The surface treatment layer may be formed alone, or in a combination of two or more. As an example of the combination, a case where a high hardness layer is first formed on the surface of the base layer and a low reflection layer is formed on the surface again can be exemplified.

The present application also relates to a display device, for example a liquid crystal display (LCD) device. An exemplary display device may comprise a liquid crystal panel, where the optical element may be attached to one or both sides of the liquid crystal panel. The film may be attached to the liquid crystal panel using, for example, an adhesive or a pressure-sensitive adhesive. Here, the adhesive or pressure-sensitive adhesive is an adhesive or pressure-sensitive adhesive other than the pressure-sensitive adhesive present in the above-described protective film.

The type of the liquid crystal panel included in the liquid crystal display device is not particularly limited. For example, without restricting the type, all the known liquid crystal panels, including various passive matrix modes including a TN (twisted neumatic) type, an STN (super twisted neumatic) type, an F (ferroelectric) type and a PD (polymer dispersed LCD) type, and the like; various active matrix modes including a two-terminal type and a three-terminal type; a transverse electric field type (IPS mode) panel and a vertical alignment type (VA mode) panel, can be applied. In addition, other types of constitutions other than those contained in the liquid crystal display device and the manufacturing methods thereof are not particularly limited, and general configurations in this field can be adopted and used without any limitation.

Advantageous Effects

The pressure-sensitive adhesive composition of the present application has excellent storage stability, exhibits an appropriate low-speed and high-speed peel forces after the cross-linked structure is formed, and has excellent balance of both. Furthermore, the pressure-sensitive adhesive formed by the pressure-sensitive adhesive composition does not leave contaminants in the adherend after peeling, while exhibiting re-detachability. Accordingly, when the pressure-sensitive adhesive composition is applied to, for example, a protective film, it is also advantageous in terms of high-speed processes by being easily peeled off upon high-speed peeling as well as it exhibits an excellent protective effect, thereby being capable of exhibiting excellent antistatic characteristics.

MODE FOR INVENTION

Hereinafter, the pressure-sensitive adhesive composition will be described in more detail with reference to Examples and Comparative Examples, but the scope of the pressure-sensitive adhesive composition is not limited to the following examples.

1. Measurement of Low-speed Peel Force

The pressure-sensitive adhesive sheets prepared in Examples and Comparative Examples were each attached to a glare prevention film (trade name: AR1, LG Chem) according to JIS Z 0237 with a roller of 2 Kg. The surface of the used glare prevention film, to which the pressure-sensitive adhesive sheet wad attached, had a contact angle of about 110 degrees for deionized water and a surface energy of about 20 mN/m or so. The glare prevention film with the attached pressure-sensitive adhesive sheet was tailored to have a width of 25 mm and a height of 100 mm and stored at 23° C. and 65% relative humidity for 24 hours. Thereafter, while peeling off the pressure-sensitive adhesive sheet from the glare prevention film at a peel angle of 180 degrees and a peel rate of 0.3 m/min in the longitudinal direction using a tensile tester (Texture Analyzer, Stable Microsystem) at room temperature, the peel force was measured. After measuring the peel force on two identical specimens, the average value was adopted.

2. Measurement of High-speed Peel Force

The pressure-sensitive adhesive sheets prepared in Examples and Comparative Examples were each attached to a glare prevention film (trade name: AR1, LG Chem) according to JIS Z 0237 with a roller of 2 Kg. The surface of the used glare prevention film, to which the pressure-sensitive adhesive sheet wad attached, had a contact angle of about 110 degrees for deionized water and a surface energy of about 20 mN/m or so. The glare prevention film with the attached pressure-sensitive adhesive sheet was tailored to have a width of 25 mm and a height of 100 mm and stored at 23° C. and 65% relative humidity for 24 hours. Thereafter, while peeling off the pressure-sensitive adhesive sheet from the glare prevention film at a peel angle of 180 degrees and a peel rate of 30 m/min in the longitudinal direction using a tensile tester (Texture Analyzer, Stable Microsystem) at room temperature, the peel force was measured. After measuring the peel force on two identical specimens, the average value was adopted.

3. Measurement of Peel Electrostatic Discharge (ESD)

The pressure-sensitive adhesive sheets prepared in Examples and Comparative Examples were each tailored to have a width of 220 mm and a height of 250 mm. The tailored pressure-sensitive adhesive sheet was attached to a glare prevention film (trade name: AR1, LG Chem) according to JIS Z 0237 with a roller of 2 Kg. The surface of the used glare prevention film, to which the pressure-sensitive adhesive sheet was attached, had a contact angle of about 110 degrees with deionized water and a surface energy of about 20 mN/m or so. Thereafter, the pressure-sensitive adhesive sheet was peeled off from the glare prevention film at a peel angle of 180 degrees and a peel rate of 40 m/min and at a temperature of 23° C. and a relative humidity of 65% Immediately after peeling, the peel electrostatic discharge was measured at a distance of 40 mm from the surface of the glare prevention film using an electrostatic potential meter (KSD-200).

4. Surface Resistance Measurement

The pressure-sensitive adhesive sheets prepared in Examples and Comparative Examples were each tailored to have a width of 150 mm and a height of 50 mm, the release PET film was peeled off from the pressure-sensitive adhesive layer and then three portions were arbitrarily selected on the surface of the pressure-sensitive adhesive layer from which the release PET film was peeled off and the surface of the release PET film, respectively, to measure the surface resistance, thereby determining the average value thereof. The surface resistance was measured using an MCP-HT 450 instrument (Mitsubishi Chemical).

Preparation Example 1. Preparation of Acrylic Polymer (A)

To a reactor refluxed by nitrogen gas and equipped with a cooling device for easy temperature control, 2-ethylhexyl acrylate (2-EHA), 4-hydroxybutyl acrylate (4-HBA), 2-hydroxyethyl acrylate (2-HEA) and methoxy polyethyleglycol metacrylate (FM-401, added moles of ethylene oxide units: 9 moles) were introduced in a weight ratio of 90:2:3:5 (2-EHA:4-HBA:2-HEA:FM-401) and 100 parts by weight of ethyl acetate as a solvent was introduced thereto. Subsequently, nitrogen gas was purged for 1 hour to remove oxygen and the temperature was maintained at 60° C. Thereafter, a reaction initiator (AIBN: azobisisobutyronitrile) and a molecular weight regulator (n-DDM: n-dodecyl mercaptan) were introduced and reacted for about 8 hours, and then the reactant was diluted with ethyl acetate to prepare an acrylic polymer having a solid content concentration of 45 wt % and a viscosity of about 2,800 cP Example 1

Preparation of Pressure-sensitive Adhesive Composition 4 parts by weight of a mixture (MHG-80B, manufactured by Asahi) of an isophorone diisocyanate-based cross-linking agent and a hexamethylene diisocyanate-based cross-linking agent as a cross-linking agent, and 0.5 parts by weight of an ionic compound (A), relative to 100 parts by weight of the acrylic polymer (A) were uniformly blended and diluted to a proper concentration in consideration of coatability to prepare a pressure-sensitive adhesive composition. Here, as the ionic compound, a compound comprising a lithium cation as the cation and having an anion, in which both of $R_1$ and $R_2$ in Formula 3 above are cyano groups and $R_f$ is a trifluoromethyl group, as the anion, was applied.

Production of Pressure-sensitive Adhesive Sheet

The pressure-sensitive adhesive composition was coated on one side of a PET (poly(ethylene terephthalate)) film (thickness: 38 μm) and dried to form a uniform coating layer having a thickness of about 20 μm. Subsequently, the coating layer was maintained at about 90° C. for about 3 minutes to induce a cross-linking reaction, and a release PET (poly(ethylene terephthalate)) film was attached on the coating layer to produce a pressure-sensitive adhesive sheet.

Examples 2 to 6 and Comparative Examples 1 to 8

A pressure-sensitive adhesive composition was prepared in the same manner as in Example 1, except that the composition of the pressure-sensitive adhesive composition was changed as shown in Tables 1 and 2 below.

TABLE 1

|  |  | Example | | | | | |
|---|---|---|---|---|---|---|---|
|  |  | 1 | 2 | 3 | 4 | 5 | 6 |
| Polymer | Type | A | A | A | A | A | A |
|  | Ratio | 100 | 100 | 100 | 100 | 100 | 100 |
| Cross-linking agent | Ratio | 4 | 4 | 4 | 4 | 4 | 4 |
| Ionic compound | Type | A | A | B | B | C | C |
|  | Ratio | 0.5 | 4 | 0.5 | 4 | 0.5 | 4 |

Ratio unit: part by weight,
Cross-linking agent type: a mixture (MHG-80B, manufactured by Asahi) of an isophorone diisocyanate-based cross-linking agent and a hexamethylene diisocyanate-based cross-linking agent,
Ionic compound A: comprising lithium cation and imidazole-based anion (in Formula 3, $R_1$ and $R_2$ are each a cyano group and $R_f$ is a trifluoromethyl group),
Ionic compound B: comprising lithium cation and imidazole-based anion (in Formula 3, $R_1$ and $R_2$ are each a cyano group and $R_f$ is a pentafluoroethyl group),
Ionic compound C: comprising sodium cation and imidazole-based anion (in Formula 3, $R_1$ and $R_2$ are each cyano group and $R_f$ is a trifluoromethyl group)

TABLE 2

|  |  | Comparative Example | | | | | | | |
|---|---|---|---|---|---|---|---|---|---|
|  |  | 1 | 2 | 3 | 4 | 5 | 6 | 7 | 8 |
| Polymer | Type | A | A | A | A | A | A | A | A |
|  | Ratio | 100 | 100 | 100 | 100 | 100 | 100 | 100 | 100 |
| Cross-linking agent | Ratio | 4 | 4 | 4 | 4 | 4 | 4 | 4 | 4 |
| Ionic compound | Type | D | D | E | E | F | F | A | A |
|  | Ratio | 0.5 | 4 | 0.5 | 4 | 0.3 | 4 | 7 | 15 |

Ratio unit: part by weight,
Cross-linking agent type: a mixture (MHG-80B, manufactured by Asahi) of an isophorone diisocyanate-based cross-linking agent and a hexamethylene diisocyanate-based cross-linking agent,
Ionic compound A: comprising lithium cation and imidazole-based anion (in Formula 3, $R_1$ and $R_2$ are each a cyano group and $R_f$ is a trifluoromethyl group),
Ionic compound D: LiTFSi (lithium bis(trifluoromethanesulfonyl)imide),
Ionic compound E: lithium trifluoromethanesulfonate,
Ionic compound F: lithium perchlorate The results of evaluating the physical properties of the pressure-sensitive adhesive compositions of Examples and Comparative Examples as prepared above were summarized and described in Tables 3 and 4 below.

TABLE 3

|  | Example | | | | | |
|---|---|---|---|---|---|---|
|  | 1 | 2 | 3 | 4 | 5 | 6 |
| L peel | 5.6 | 7.2 | 4.9 | 7.0 | 4.7 | 7.1 |
| H peel | 72 | 121 | 70 | 110 | 67 | 112 |
| ESD | 0.6 | 0.1 | 0.8 | 0.2 | 0.9 | 0.2 |
| Surface resistance | 0.8 | 0.2 | 0.9 | 0.2 | 0.9 | 0.3 |

L peel: low-speed peel force (unit: gf/25 mm),
H peel: high-speed peel force (unit: gf/25 mm),
ESD: peel electrostatic discharge (unit: kV),
Surface resistance unit: ×10$^{10}$ Ω☐

TABLE 4

|  | Comparative Example | | | | | | | |
|---|---|---|---|---|---|---|---|---|
|  | 1 | 2 | 3 | 4 | 5 | 6 | 7 | 8 |
| L peel | 6.1 | 8.1 | 6.9 | 8.8 | 5.5 | 7.3 | 10.2 | 13.5 |
| H peel | 79 | 140 | 88 | 144 | 71 | 102 | 223 | 273 |
| ESD | 1.9 | 0.8 | 2.1 | 1.3 | 2.2 | 1.3 | 0 | 0 |
| Surface resistance | 5.6 | 2.2 | 4.8 | 1.6 | 6.8 | 2.7 | 0.2 | 0.1 |

L peel: low-speed peel force (unit: gf/25 mm),
H peel: high-speed peel force (unit: gf/25 mm),
ESD: peel electrostatic discharge (unit: kV),
Surface resistance unit: ×10$^{10}$ Ω☐

It can be confirmed through the results of Tables 3 and 4 that when ionic compounds containing imidazole-based anions are used (Examples 1 to 5), the ESD characteristics and the like are excellent and the peel force characteristics are also secured, as compared with the case of using the conventionally used ionic compounds (D to F). In addition, from the results of Comparative Examples 7 and 8, it can be confirmed that the peel force is greatly increased when the ratio of the ionic compound containing an imidazole-based anion exceeds 5 parts by weight. Also, from the results of Tables 3 and 4, it can be confirmed that the ionic compounds containing anions of the present invention are particularly effective in reducing the surface resistance of the pressure-sensitive adhesive.

The invention claimed is:
1. A pressure-sensitive adhesive composition comprising an acrylic polymer and an ionic compound, wherein the ionic compound is included in a ratio of 0.001 to 5 parts by weight relative to 100 parts by weight of said acrylic polymer and comprises an imidazole-based anion and a metal cation,
wherein the imidazole-based anion is represented by Formula 3 below:

[Formula 3]

wherein, Rf is a trifluromethyl group, and R1 and R2 are each a cyano group, and
wherein the metal cation is a lithium cation.
2. The pressure-sensitive adhesive composition according to claim 1, wherein the acrylic polymer is a polymer of a monomer mixture comprising an alkyl (meth)acrylate; a first monomer represented by Formula 1 below, where the carbon number contained in an alkylene group of A and B in Formula 1 below is in a range of 1 to 3; a second monomer represented by Formula 1 below, where the carbon number contained in an alkylene group of A and B in Formula 1 below is in a range of 4 to 8; and a compound of Formula 2 below:

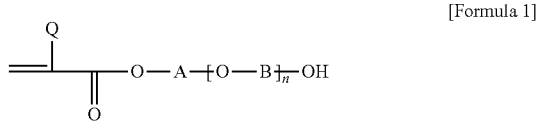

[Formula 1]

wherein, Q is hydrogen or an alkyl group, A and B are each independently an alkylene group, and n is a number in a range of 0 to 10:

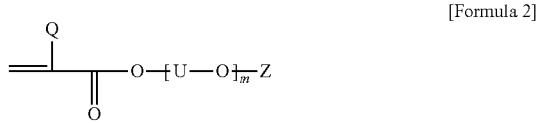

[Formula 2]

wherein, Q is hydrogen or an alkyl group having 1 to 4 carbon atoms, U is an alkylene group having 1 to 4 carbon atoms, Z is hydrogen, an alkyl group or an aryl group, and m is a number of 1 or more.

3. The pressure-sensitive adhesive composition according to claim 1, further comprising an aliphatic isocyanate cross-linking agent.

4. The pressure-sensitive adhesive composition according to claim 3, wherein the cross-linking agent comprises at least one selected from the group consisting of an aliphatic cyclic isocyanate compound and an aliphatic acyclic isocyanate compound.

5. The pressure-sensitive adhesive composition according to claim 3, wherein the cross-linking agent is contained in an amount of 0.01 parts by weight to 15 parts by weight relative to 100 parts by weight of the acrylic polymer.

6. A surface protective film comprising a surface protective base layer; and a pressure-sensitive adhesive layer which is formed on one or both sides of said base layer and comprises the pressure-sensitive adhesive composition according to claim 1 in a cross-linked state.

7. An optical element in which the protective film of claim 6 is attached to a surface so as to be detachable.

8. The optical element according to claim 7, wherein the surface to which the protective film is attached has a surface energy of 30 mN/m or less.

9. A display device comprising the optical element of claim 7.

* * * * *